(12) United States Patent
Niwa

(10) Patent No.: US 7,538,327 B2
(45) Date of Patent: May 26, 2009

(54) ELECTRONIC APPARATUS AND METHOD OF CONTROLLING SAME

(75) Inventor: Hiroaki Niwa, Meguro-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 19 days.

(21) Appl. No.: 11/625,360

(22) Filed: Jan. 22, 2007

(65) Prior Publication Data
US 2007/0173108 A1  Jul. 26, 2007

(30) Foreign Application Priority Data
Jan. 24, 2006 (JP) ............................ 2006-015492

(51) Int. Cl.
*H01L 27/146* (2006.01)

(52) U.S. Cl. ............................... 250/370.09

(58) Field of Classification Search . 250/370.1–370.15, 250/370.09; 378/91, 114–115, 98, 98.2–98.12, 378/65–76
See application file for complete search history.

(56) References Cited

U.S. PATENT DOCUMENTS 5,844,961 A * 12/1998 McEvoy et al. ............ 378/98.8

FOREIGN PATENT DOCUMENTS

| JP | 03057013 A | * | 3/1991 |
| JP | 03108963 A | * | 5/1991 |
| JP | 09-021879 |   | 1/1997 |
| JP | 11-271454 |   | 10/1999 |

\* cited by examiner

*Primary Examiner*—David P Porta
*Assistant Examiner*—Kiho Kim
(74) *Attorney, Agent, or Firm*—Locke Lord Bissell & Liddell LLP

(57) ABSTRACT

An electronic apparatus having a cable connector unit that makes it possible to attach and detach a connector for connecting a cable for the purpose of performing data communication with an external apparatus includes a lock mechanism for maintaining a connection with the connector in a lock state. The electronic apparatus is capable of detecting a predetermined specific operation on the attached connector. If the specific operation is detected, then pre-processing necessary to detach the connector safely is executed. By releasing the lock mechanism in response to completion of pre-processing, the cable can be removed.

7 Claims, 8 Drawing Sheets

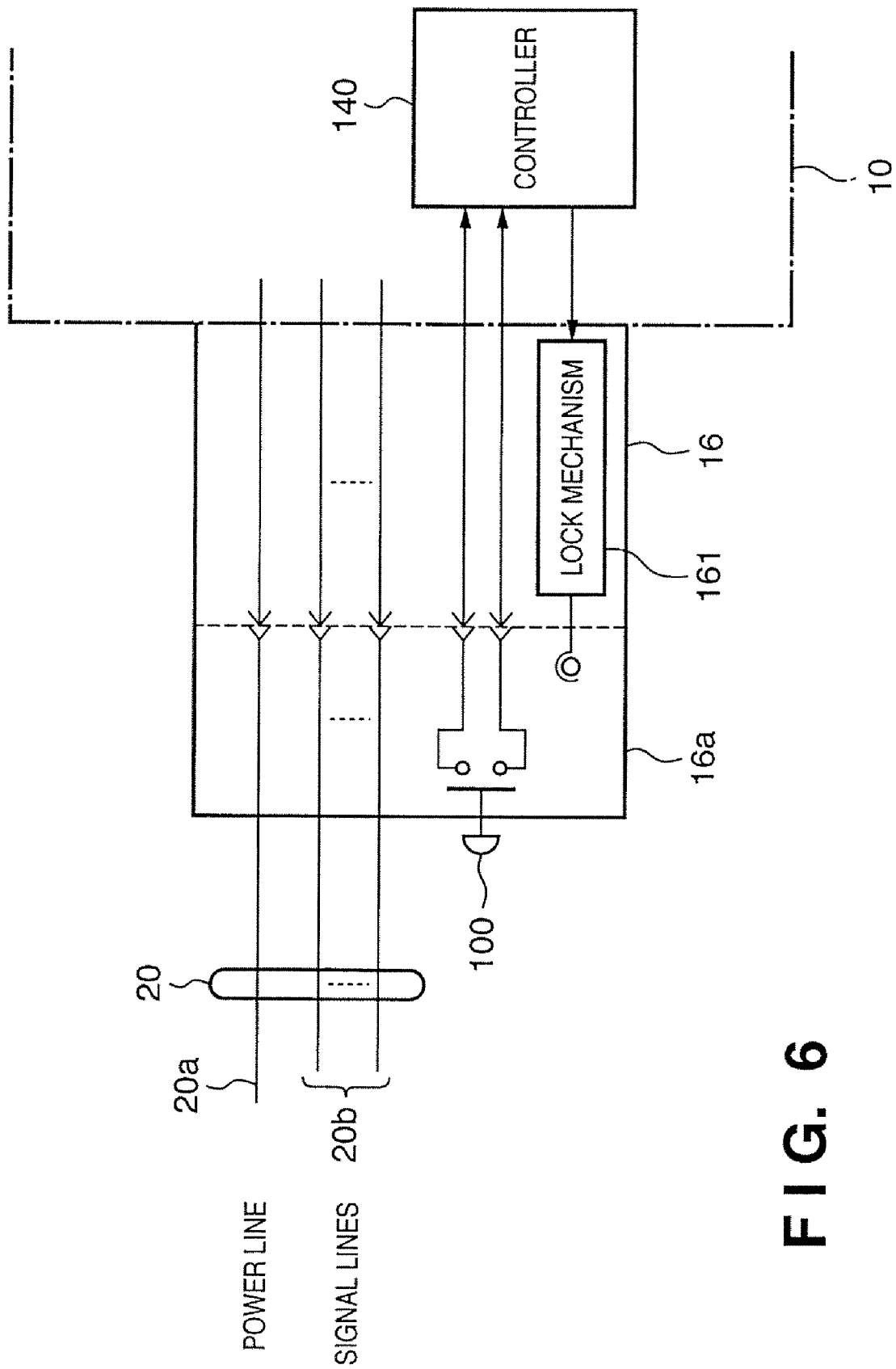
F I G. 6

ELECTRONIC APPARATUS AND METHOD OF CONTROLLING SAME

BACKGROUND OF THE INVENTION

1. Field of the Invention

The present invention relates to a cable connecting mechanism in an electronic apparatus. More particularly, the invention relates to a cable connecting mechanism ideal for a radiation imaging apparatus that records a radiation image.

2. Description of the Related Art

X-ray photography for the purpose of medical diagnosis often makes use of a film screen system that is a combination of an intensifying screen and X-ray photographic film. According to this method, X-rays that have passed through a subject and contain information about the interior of the subject are converted by the intensifying screen to visible light that is proportional to the strength of the X-rays. A radiograph is formed on the X-ray film as a result of photosensitizing the film by the visible light.

Various types of digital imaging apparatus have also come into widespread use in recent years in areas such as the chest ordinarily imaged conventionally using X-ray film, and it is now possible to acquire digital images in the field of diagnostic imagery. For example, a high-resolution digital X-ray detector has been proposed [see the specification of Japanese Patent Application Laid-Open No. 09-021879 (pp. 7 to 11; FIG. 1)]. This digital X-ray detector comprises a two-dimensional array in which 3000 to 4000 detection elements, for example, are arrayed in each dimension. Typically, photodiodes or the like serve as the detection elements. Each detection element produces an electric signal that corresponds to the pixel luminance of the X-ray image projected upon the detector. The signal from each detection element is read out individually and digitized. Image processing is subsequently executed using the digitized data and the processed data is stored and/or displayed.

A portable X-ray digital imaging apparatus (referred to as an "electronic cassette" below) has also been proposed in accordance with certain applications. Such as electronic cassette is desired to be as small and light in weight as possible in consideration of portability and operability. However, the electronic cassette necessitates a large number of components in order to output an X-ray image of a patient as digital image data. For example, the electronic cassette requires a two-dimensional array sensor for receiving the X-rays that have passed through the subject, and a drive circuit for driving the two-dimensional array sensor in accordance with a control signal that is output from an X-ray generator. The electronic cassette further requires an amplifier for selecting a matrix within the two-dimensional array sensor by the drive circuit and amplifying the data of each matrix, an AD circuit for converting the output of the amplifier to digital data, and a circuit for serializing image data that has been digitized successively by the AD circuit and the drive circuit. As a consequence of the foregoing, it is difficult to reduce the size and weight of the electronic cassette in comparison with a film cassette.

Accordingly, a detachable-cable-type electronic cassette has been proposed in order to improve the operability and reduce the size and weight of an electronic cassette [see the specification of Japanese Patent Application Laid-Open No. 11-271454 (pp. 3, 4; FIG. 5)]. Specifically, the reduction in size and weight is achieved by so arranging it that circuitry inclusive of a circuit that transmits data by wire is contained within the electronic cassette. The proposed arrangement is such that when imaging is performed, a cable for supplying power or for communication is connected to the electronic cassette.

However, if the cable is detached unintentionally in such a detachable-cable-type electronic cassette, an error or malfunction may occur in the imaging section depending upon the timing of such cable detachment. In order to avoid such a situation, it has been considered to provide the imaging section or a control panel with a display indicating the state of cable detachability. However, this proposal does not make it possible to prevent the danger that the cable will be detached at an unintended timing due to operator error.

SUMMARY OF THE INVENTION

The present invention has been devised in view of the foregoing circumstances and provides a cable connecting mechanism in which the attaching and detaching of a cable is possible only under safe conditions.

According to one aspect of the present invention, there is provided an electronic apparatus having a cable connector unit that makes it possible to attach and detach a connector for connecting a cable for the purpose of performing data communication with an external apparatus, comprising: a lock mechanism adapted to maintain a connection with the connector in a lock state; a detection unit adapted to detect a first operation on the connector; a pre-processing unit adapted to execute pre-processing, which is to be executed before the connector is detached, in a case where the first operation has been detected; and a release unit adapted to release the lock mechanism in response to completion of the pre-processing.

Further features of the present invention will become apparent from the following description of exemplary embodiments (with reference to the attached drawings).

BRIEF DESCRIPTION OF THE DRAWINGS

FIG. 6 is a diagram useful in describing the details of a connector and cable connector unit;

DESCRIPTION OF THE EMBODIMENTS

Preferred embodiments of the present invention will now be described in detail in accordance with the accompanying drawings.

It should be noted that the present invention is not limited to the embodiments that follow and that the constituent elements thereof may be replaced with alternatives to the extent that the object of the present invention is attained. In the embodiments below, the invention is described taking an electronic cassette for X-ray photography as an example of an electronic apparatus having a cable connector unit that makes it possible to attach and detach a connector for connecting a cable for the purpose of data communication with an external apparatus.

First Embodiment

Figure 1:
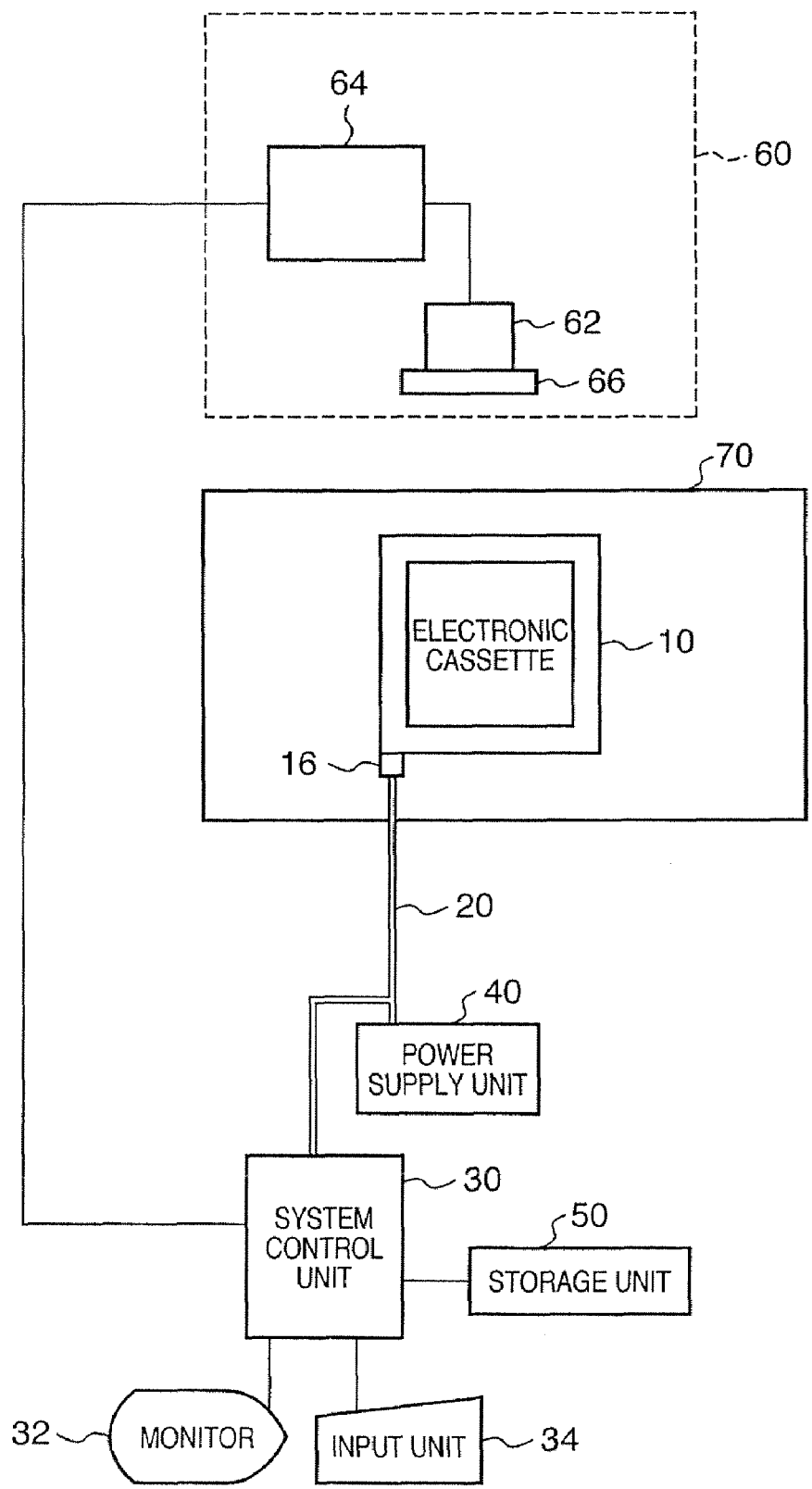
FIG. 1 is a block diagram illustrating the general configuration of an X-ray imaging system.

FIG. 1 is a block diagram illustrating the configuration of an X-ray imaging system according to this embodiment. As illustrated in FIG. 1, the X-ray imaging system includes an electronic cassette 10, a cable 20, a system control unit 30, a power supply unit 40, a storage unit 50 and an X-ray generator 60. The X-ray imaging system acquires the internal structure of a subject as digital image data using emitted X-rays. It should be noted that the radiation used in this system has a wavelength ranging from 0.005 to 400 Å, and that X-rays within a range of wavelengths of from 0.1 to 15 Å is particularly suitable.

The electronic cassette 10 is an imaging apparatus for converting X-rays, which have passed through a subject, to visible light, converting the visible light to an electric signal and forming digital image data representing the subject. The electronic cassette 10 is provided with a cable connector unit 16 that makes it possible to removably attach the cable 20.

Figure 2:
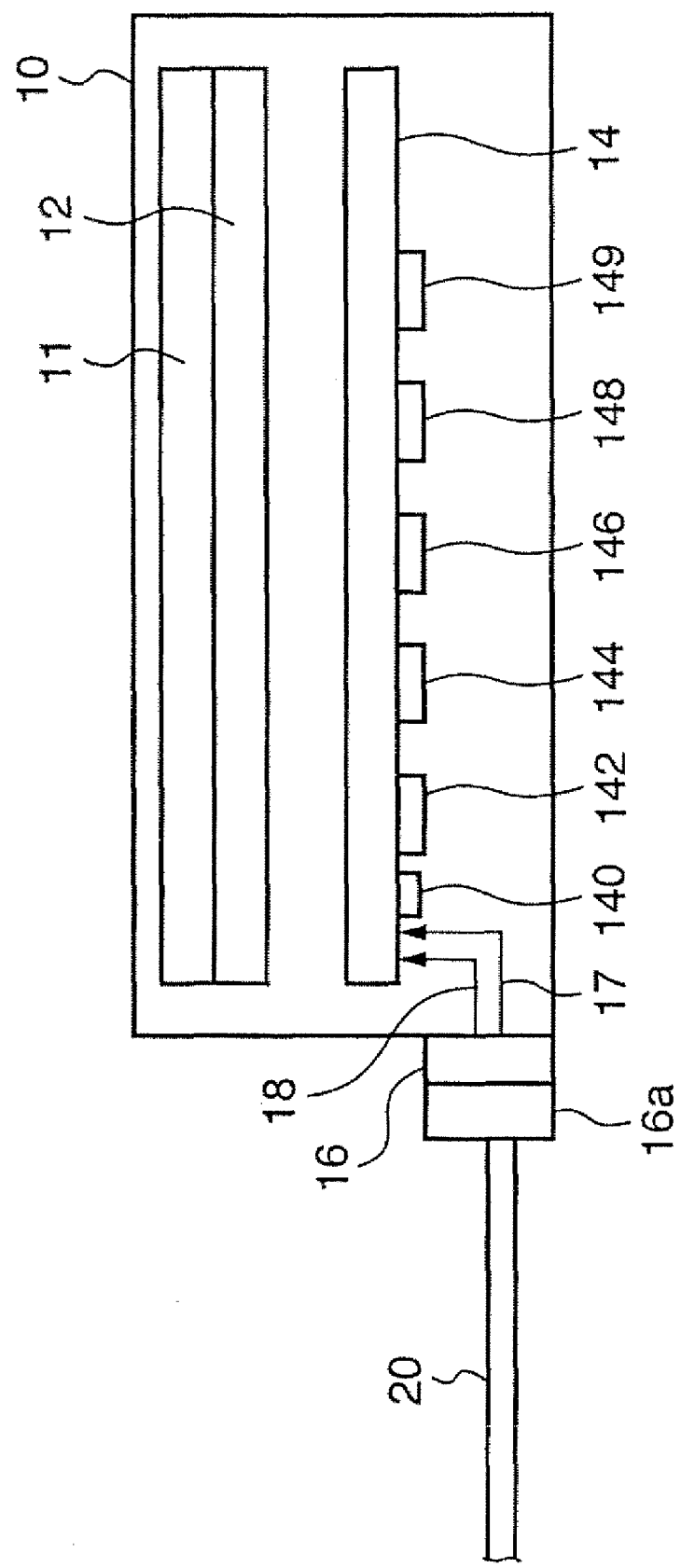
FIG. 2 is a sectional block diagram illustrating the internal structure of an electronic cassette.

FIG. 2 is a sectional block diagram for describing the structure of the electronic cassette 10. As illustrated in FIG. 2, the electronic cassette 10 includes a scintillator 11, an optical image detector 12, a circuit board 14 and the cable connector unit 16. The scintillator 11 converts the X-rays that have passed through the subject to visible light. The cable connector unit 16 makes it possible for the cable 20 to be removably attached by a connector 16a. That is, the connector 16a that has been connected to the cable 20 is capable of being removably attached to the cable connector unit 16.

The scintillator 11 contains a matrix of phosphors excited by high-energy X-rays and produces fluorescence in the visible region owing to recombining energy when recombination occurs. The fluorescence results from the matrix itself, such as $CaWO_4$, or from a light-emitting core substance activated within the matrix, such as CSI:TI and ZnS:Ag. The optical image detector 12 is placed in intimate contact with the scintillator 11 and comprises optoelectronic transducers and thin-film transistors (TFTs) arrayed in the form of a matrix. The optical image detector 12 converts the visible light, which is emitted from the scintillator 11 owing to the emission of X-rays, to an electric signal.

Mounted on a circuit board 14 are a drive circuit 142 for driving the optical image detector 12 in accordance with a control signal from the system control unit 30, and an amplifier 144 for amplifying an analog signal from an element (which corresponds to a pixel) within the optical image detector 12 selected by the drive circuit 142. Further mounted on the circuit board 14 are an A/D circuit 146 for converting the output of the amplifier 144 to digital data, a serializing circuit 148 for serializing image data that has been digitized successively by the driver circuit 142 and A/D circuit 146, and an image memory 149, etc. A power cable 17 for supplying the above-mentioned components with power and a signal cable 18 for signal transmission are wired to the circuit board 14. A controller 140 exercises overall control of flow of signals among circuits on the circuit board 14 and the operation of each circuit. The controller 140 also has a communication control function for controlling transfer of image data via the signal line of the cable 20.

With reference again to FIG. 1, the power supply unit 40 supplies power to each part of the X-ray imaging apparatus via the cable 20 and power cable 17. The cable 20 is constituted by a signal line that transmits data between the electronic cassette 10 and system control unit 30, and a power line for supplying power between the electronic cassette 10 and the power supply unit 40. Thus the cable 20 connects the electronic cassette 10, the system control unit 30 and the power supply unit 40.

The cable connector unit 16 has a connection opening for connecting the cable 20 to the electronic cassette 10 and makes it possible for the cable 20 to be removably attached to the electronic cassette 10. The cable connector unit 16 is equipped with a mechanism for detecting that a first action of a cable detaching operation has been performed, and with a cable lock mechanism.

Figure 3:
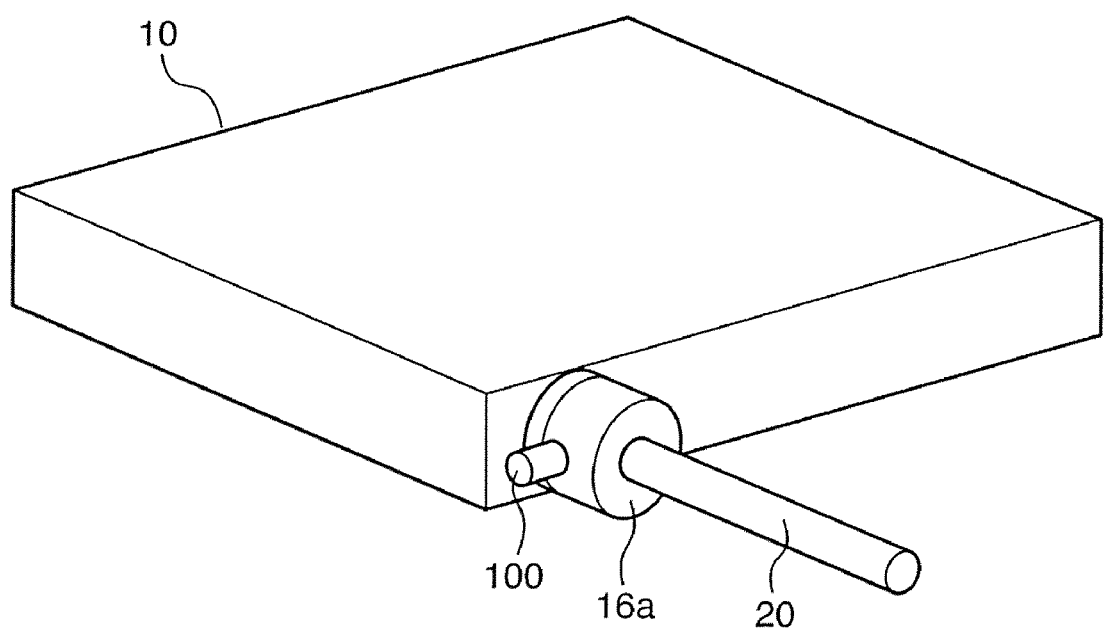
FIG. 3 is a diagram illustrating the external appearance of a connecting portion.

An example of the structure of the cable connector unit 16 is illustrated in FIG. 3. The cable connector unit 16 has a detection mechanism for detecting state of a cable detaching button 100 equipped on the connector 16a. By pressing the button 100, information indicative of this fact is transmitted to the controller 140 within the electronic cassette 10, and pre-processing for detaching the cable starts. When pre-processing ends, the cable lock is released and it becomes possible to detach the cable 20. In this embodiment, the operation of pressing the cable detaching button 100 corresponds to the first action mentioned above. The details of processing relating to the cable detaching operation will be described later.

With reference again to FIG. 1, the system control unit 30 has a monitor 32, an input unit 34 and the storage unit 50. The system control unit 30 subjects the digital image data, which has been transmitted from the electronic cassette 10, to correction and spatial-filtering processing, etc., in real time, applies grayscale processing and DR (dynamic range) processing and displays the processed digital image data on the monitor 32. The system control unit 30 stores the processed digital image data in the storage unit 50. Furthermore, the system control unit 30 changes over the display of data on the monitor 32 and, based upon the input information from input unit 34, controls the driving of the X-ray generator 60 and circuit board 14.

The system control unit 30 is equipped with a LAN board (not shown) and therefore is capable of being connected to a LAN via the LAN board. Connected to the LAN are a filing server for filing images, an image printer for outputting images to film, and an image processing terminal for executing complex image processing and diagnostic assistance. The system control unit 30 outputs digital image data in accordance with a prescribed protocol (e.g., DICOM).

The input unit 34 includes a touch-sensitive panel, a mouse, a keyboard and a foot switch, etc. By using the input unit 34, the operator of the X-ray imaging apparatus is capable of setting the imaging conditions necessary for imaging (e.g., X-ray tube voltage, tube current and X-ray emission time, etc.), imaging timing, image processing conditions, patient ID and method of processing captured images.

The monitor 32 comprises a CRT display and displays imaging conditions and captured images, etc., that have been input by the input unit 34. Although content displayed on the monitor 32 is changed over automatically under the control of the system control unit 30, it may be so arranged that the changeover is performed manually by a changeover button, not shown. Further, as mentioned above, the monitor 32 receives and displays digital image data from the system control unit 30.

Under the control of the system control unit 30, the storage unit 50 stores digital image data that has undergone various processing. A data archiving device satisfying the requirements of large storage capacity, high speed and high reliability is preferred as the storage unit 50, and a hard disk array such as a RAID is particularly preferred.

The X-ray generator 60, which has an X-ray tube 62, a high-voltage power source 64 and an X-ray diaphragm 66, generates X-rays. The X-ray tube 62, which is driven by the high-voltage power source 64 controlled by the system control unit 30, emits an X-ray beam. The X-ray diaphragm 66 shapes the X-ray beam in such a manner that unnecessary emission of X-rays will not occur as the imaged area changes. The X-ray beam is directed toward the portion of the patient imaged.

An imaging sequence will now be described in simple terms.

When X-ray photography is performed, the operator first inserts the electronic cassette 10, to which the cable 20 has not been connected, between the patient and bed 70. The reason for inserting the electronic cassette 10 without the cable 20 being connected thereto is to eliminate the inconvenience of having to decide the placement position of the electronic cassette 10 while taking care in routing the cable 20 so that it will not enter the imaging area.

If placement of the electronic cassette 10 at a position adapted to the region of the patient desired to be imaged has been completed, the cable 20 is connected to the cable connector unit 16. Next, start of imaging is transmitted to the system control unit 30 via the input unit 34. The system control unit 30 responds to start of imaging by transmitting an imaging-start signal to the electronic cassette 10. Further, the system control unit 30 drives the X-ray tube 62 of the X-ray generator 60 via the high-voltage power source 64 and drives the X-ray diaphragm 66 to specify the emission field and cause the emission of the X-ray beam.

As for operation in the electronic cassette 10, the drive circuit 142 mounted on the circuit board 14 performs imaging in accordance with imaging timing and reads out stored electric charge. That is, the drive circuit 142 drives the optical image detector 12 under the control of the system control unit 30 and reads signals from each of the pixels. The signal from each pixel within the optical image detector 12 read out by the drive circuit 142 is amplified by the amplifier 144, and the amplified signal is converted to digital data by the A/D circuit 146. Data thus obtained by successive digitization by the drive circuit 142 and A/D circuit 146 is serialized by the serializing circuit 148, whereby digital image data is acquired. The acquired digital image data is stored temporarily in the image memory 149 and is transmitted from the electronic cassette 10 to the system control unit 30 via the cable 20. The system control unit 30 subjects the transmitted digital image data to correction and various processing and stores the processed digital image data in the storage unit 50.

Figure 4:
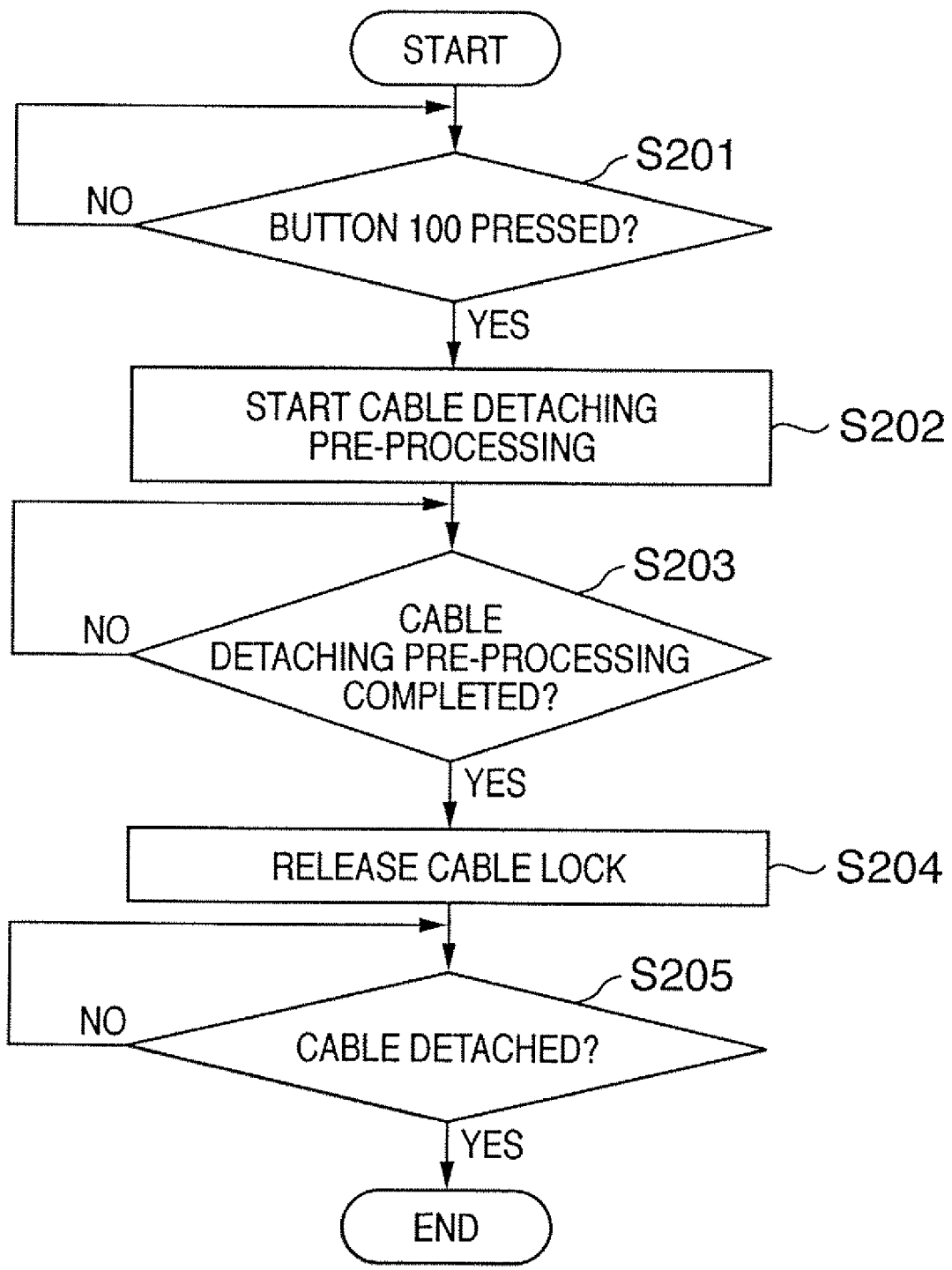
FIG. 4 is a flowchart useful in describing processing executed when a cable is detached according to a first embodiment of the invention.

Next, operation when the cable 20 is detached from the electronic cassette 10 will be described with reference to FIGS. 3, 4 and 6.

FIG. 6 is a diagram useful in describing in detail the arrangement of the connector 16a and the cable connector unit 16, which is part of the electronic cassette 10. As illustrated in FIG. 6, the cable 20 has a power line 20a and a plurality of signal lines 20b. A lock mechanism 161 possessed by the cable connector unit 16 is controlled between locked and unlocked states in accordance with a lock signal from the controller 140. If the connector 16a is connected to the cable connector unit 16, the controller 140 establishes a state of communication with the system control unit 30 via the lines 20b. If the communicating state has been established, the controller 140 places the lock mechanism 161 in the locked state so that the cable connector unit 16 and connector 16a are maintained in the connected state. Alternatively, it may be so arranged that the controller 140 detects that the connector 16a has been connected to the cable connector unit 16 and places the lock mechanism 161 in the locked state in response to the detection. If a signal indicating that the cable detaching button 100 is ON is supplied to the controller 140, then the controller 140 terminates the established state of communication with the system control unit 30 and releases the lock mechanism 161, thereby enabling the connector 16a to be detached from the cable connector unit 16.

The detaching of the cable is performed by two actions. That is, the operator first presses the cable detaching button 100 as a first action. When the controller 140 of the electronic cassette 10 detects that the cable detaching button 100 has been pressed ("YES" at step S201), the controller 140 executes pre-processing for cable detachment (step S202). Cable detaching pre-processing includes various processes for so arranging it that detaching of the cable can be performed without causing an error or damage in, e.g., the electronic cassette 10 and system control unit 30. An example of cable detaching pre-processing that can be mentioned is communication termination processing for closing communication ports between the electronic cassette 10 and system control unit 30 or for transmitting a termination command. It may be so arranged that this communication termination processing includes processing for maintaining the content of the image memory 149 by a back-up power supply to make possible the retransmission of an image. Alternatively, it may be so arranged that the communication termination processing includes processing for saving an image in a non-volatile memory (e.g., a Flash memory) to make possible the retransmission of the image.

Further, communication termination processing may include processing for cutting off the supply of power to the imaging section (electronic cassette) 10 by the power supply unit 40. Accordingly, if the cable has been pulled out, supply of power-supply voltage to the extracted cable end is cut off, thereby making it possible to assure safety. If the cable is re-inserted, however, this is detected and the output of power from the power supply unit 40 is turned ON.

Further, communication termination processing may include processing for counting the cumulative number of times cable detachment has been performed and then notifying the system control unit 30 of the count. An example of utilization of the cumulative count is an application that would display a message recommending replacement based upon connector lifetime (because there is a limit upon the number of times the connector can be attached and detached).

When the above-described pre-processing for detaching the cable ends ("YES" at step S203), the controller 140 releases the lock mechanism 161 from the locked state (step S204). It should be noted that the lock mechanism 161 can also be implemented by an ordinary electronic lock mechanism, by way of example. In response to release of the lock by the lock mechanism 161, the operator is capable of detaching the cable 20 from the electronic cassette 10 as the second action (step S205).

Figure 7:
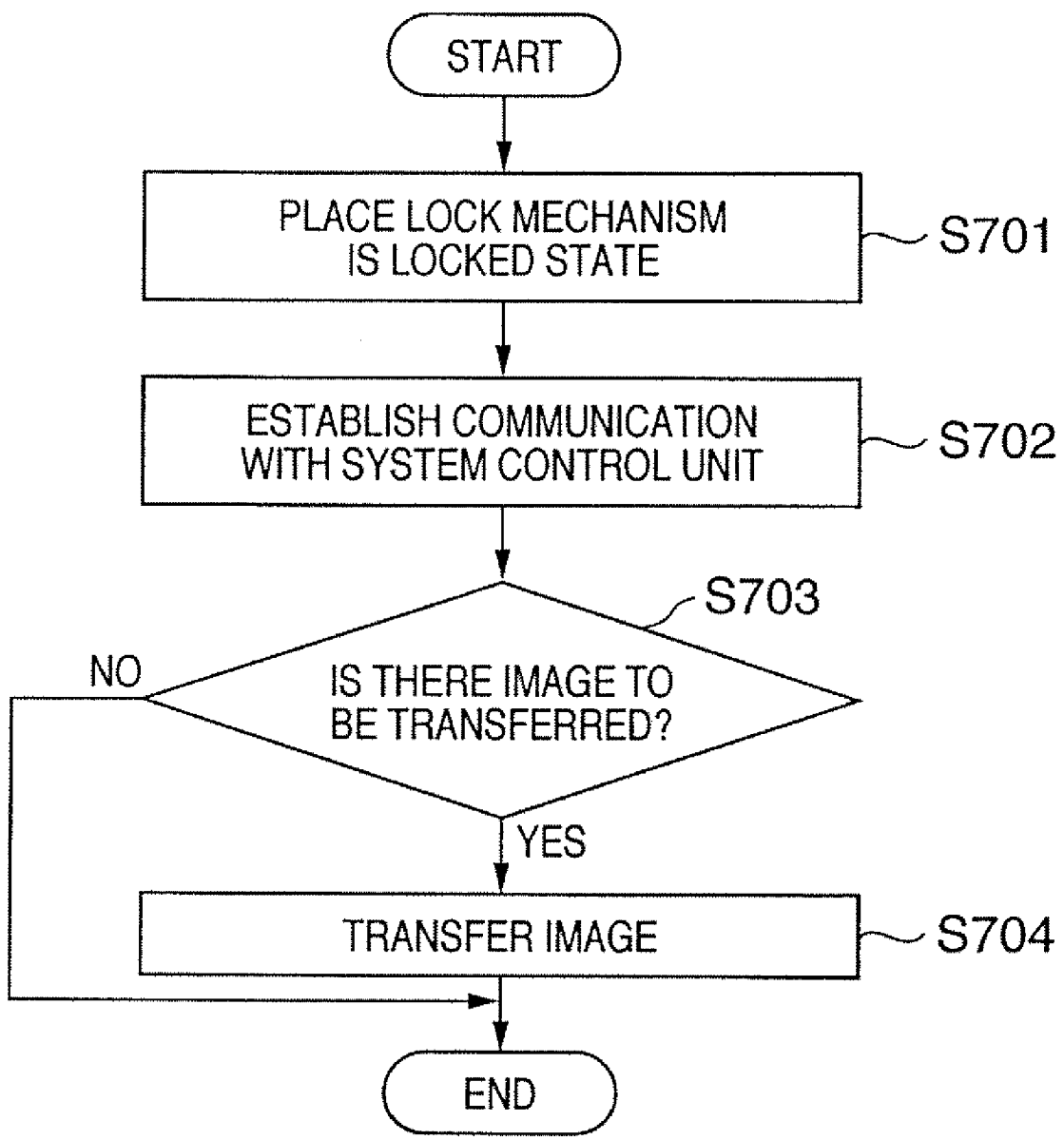
FIG. 7 is a flowchart useful in describing processing executed when a cable is connected.

Further, when the cable is attached, connection processing of the kind illustrated in the flowchart of FIG. 7 is executed. Upon detecting that the connector 16a has been connected to the cable connector unit 16, the system control unit 30 causes the power supply unit 40 to start supplying electric power via the cable 20. Any method may be used by the system control unit 30 to detect the connection between the cable connector unit 16 and the connector 16a. For example, if two signal lines in the cable connector unit 16 are jumped, the system control unit 30 can detect the connection between the cable connector unit 16 and the connector 16a by detecting the connection between these two signal lines. The electronic cassette 10 detects the connection of the cable to the cable connector unit 16 by the supply of power from the power supply unit 40 and starts the connection processing of FIG. 7. The processing set forth below can be cited as an example of connection processing.

(1) The lock mechanism 161 is placed in the locked state to thereby lock the connector 16a so that it will be maintained in the attached state (step S701).

(2) Ports are opened for the purpose of establishing a state of communication with the system control unit 30 (step S702).

(3) In a case where transfer of an image is in progress, e.g., in a case where an image to be transferred still remains in the image memory 149, the image being held in the image memory 149 is retransferred (steps S703, S704).

(4) The power supply unit 40 is controlled to start power supply to the electronic cassette 10.

Figure 8:
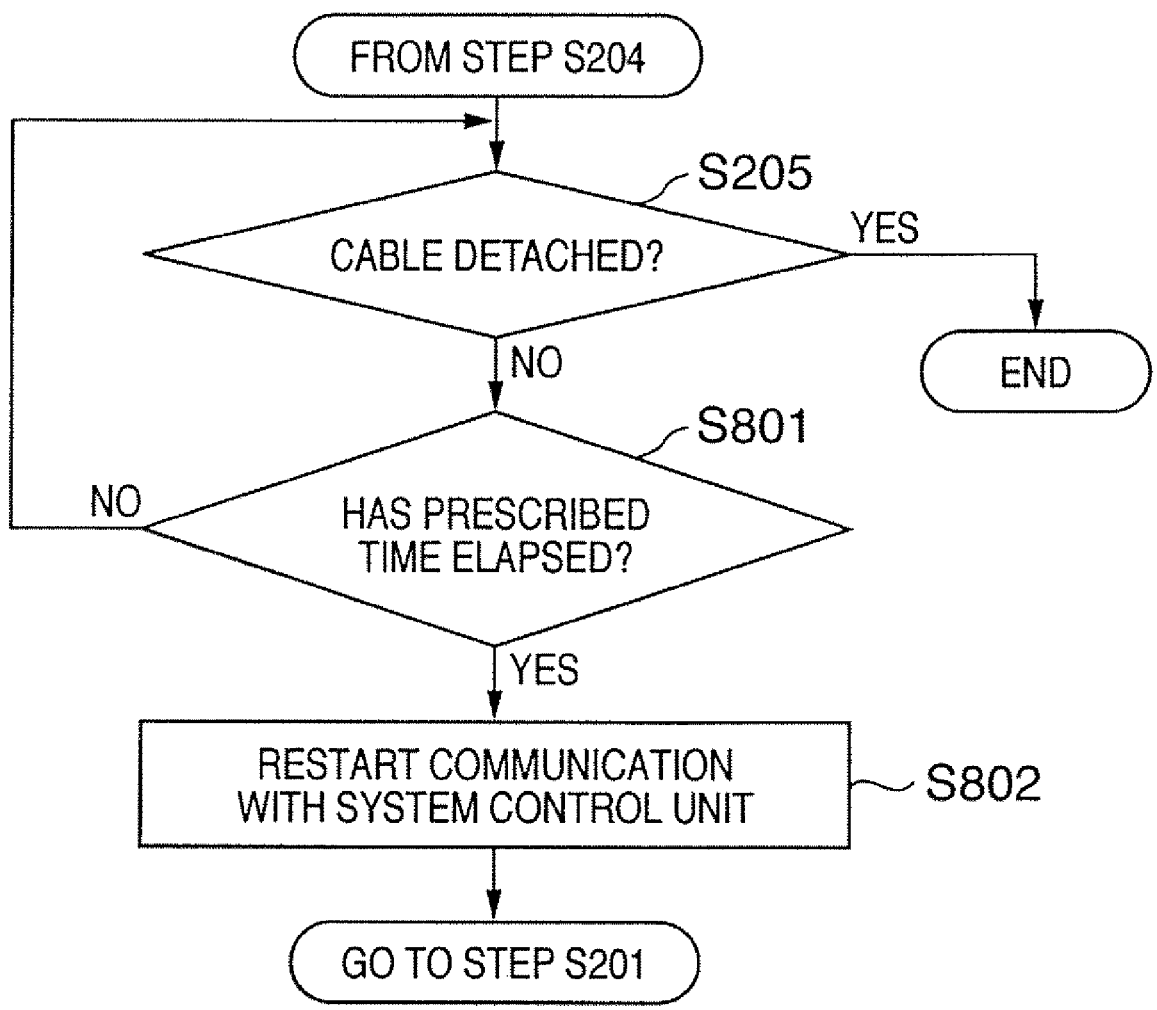
FIG. 8 is a flowchart illustrating a modification of processing executed when a cable is detached.

It should be noted that a mechanism for presenting a display as by an LED may be provided. Specifically, if the lock mechanism 161 has been released from the locked state in the cable connector unit 16 to make possible the detachment of the connector 16a, this fact would be indicated by the LED, etc. Further, it may be so arranged at step S205 above that the above-described connection processing is executed automatically in a case where the connector 16a has not been detached from the cable connector unit 16 upon elapse of a prescribed period of time. In this case, processing illustrated in the flowchart of FIG. 8 would be executed. Specifically, if a "NO" decision is rendered at step S205 in FIG. 4, then it is determined whether a prescribed period of time has passed since pressing of the cable detaching button 100 (step S801). If the prescribed period of time has elapsed ("YES" at step S801), then the above-described connection processing (the connection processing of FIG. 7) is executed (step S802).

Further, the foregoing embodiment has been described with regard to a case where there is a single cable connector unit 16. However, it should be obvious that the present invention is applicable also to a case where a plurality of cable connector units are provided. Further, since the imaging section is capable of performing imaging freely in any direction, which direction on the acquired image is the upward direction (i.e., which point is the image origin) depends upon the particular case. Usually, imaging is performed upon setting the electronic cassette in a direction that takes the direction of the image into account, or the displayed image is rotated in a desired direction after imaging is completed. By contrast, in a cassette having a plurality of cable connector units, it may be so arranged that the image direction (the image origin) is decided in accordance with the cable connector unit that is being used (the cable connector unit to which the cable is actually connected). (For example, it may be assumed that the connector unit to which the cable has been connected is always at the lower portion of the image.) In this case, the captured image is displayed upon rotating the image automatically in accordance with the connector unit being used. Further, in the foregoing embodiment, the controller 140 controls the lock mechanism 161. However, the invention is not limited to such an arrangement. For example, it may be so arranged that the signal from the cable detaching button 100 is input to the system control unit 30, thereby allowing the lock mechanism 161 to be controlled from the system control unit 30. In this case, the processing shown in FIG. 4 would be executed by the system control unit 30.

Second Embodiment

Figure 5:
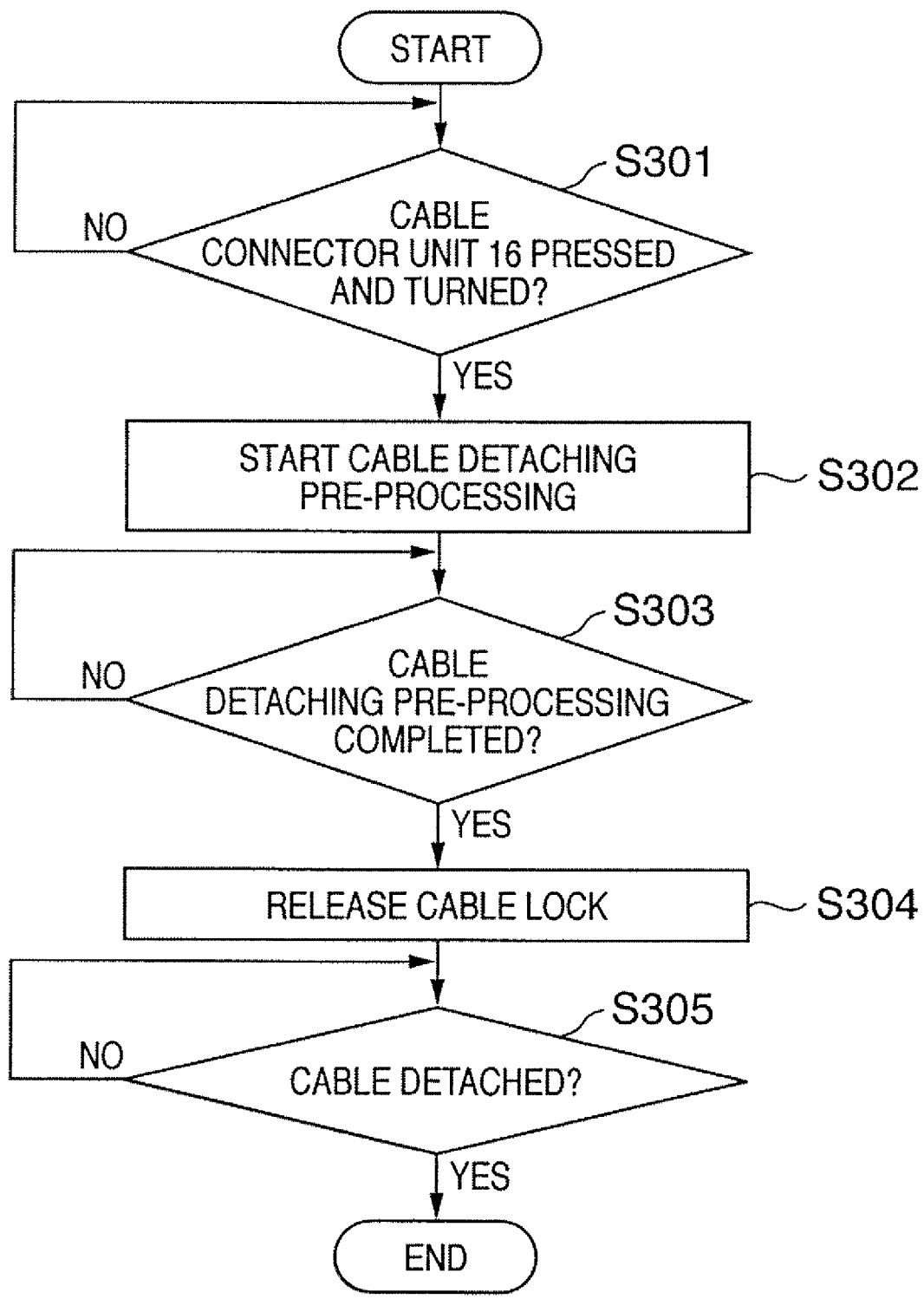
FIG. 5 is a flowchart useful in describing processing executed when a cable is detached according to a second embodiment of the invention.

In the first embodiment, the first action performed at the time of cable detachment is the pressing of the cable detaching button 100. However, the invention is not limited to this arrangement. In a second embodiment, a case where the cable connector unit is pressed and turned as an example of the first action will be described. The second embodiment will be described below with reference to FIG. 5.

First, an operation in which the connector unit is pressed and turned is performed ("YES" at step S301). For example, by incorporating a switch that is turned ON by this operation, the controller 140 is notified of the fact that the connector 16 has been subjected to the first action (operation). In response, the cable detaching pre-processing described in the first embodiment is executed (step S302). Upon completion of the cable detaching pre-processing ("YES" at step S303), the cable lock is released (step S304) and it becomes possible to detach the cable (step S305).

Thus, in accordance with the embodiments as described above, the attaching and detaching of a cable can be performed by an operator safely at any timing without causing an error or damage in the imaging apparatus or system. Further, in accordance with the embodiments, a mechanism is provided for enabling the system or imaging section to execute cable detaching pre-processing during the course of a series of operations for attaching or detaching a cable. As a result, it is possible to provide a highly safe X-ray imaging apparatus in which the system or imaging section will not be caused to malfunction regardless of the timing at which the user attaches or detaches a cable.

In accordance with the present invention, it is possible assure that the attaching and detaching of a cable will be performed under safe conditions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-015492, filed Jan. 24, 2006, which is hereby incorporated by reference herein in its entirety.

What is claimed is:

1. An electronic apparatus having a cable connector unit that makes it possible to attach and detach a connector for connecting a cable for the purpose of performing data communication with an external apparatus, comprising:

a lock mechanism adapted to maintain a connection with the connector in a lock state;

a detection unit adapted to detect a first operation on the connector;

a pre-processing unit adapted to execute pre-processing, which is to be executed before the connector is detached, in a case where the first operation has been detected;

a release unit adapted to release said lock mechanism in response to completion of pre-processing, a connection control unit adapted to execute connection processing, which includes communication start processing for starting communication with the external apparatus, when connection of the cable to said cable connector unit has been detected, wherein the connection control unit restarts communication with the external apparatus via the cable in a case where detaching of the cable has not been performed in a predetermined period following execution of pre-processing, and wherein the pre-processing includes communication termination processing for terminating the supply of power to the cable where, if the cable is subsequently reinserted, then the cable's reinsertion is detected and the power supply resumes.

2. The apparatus according to claim 1, wherein said detection unit detects the state of a switch with which the connector has been provided.

3. The apparatus according to claim 1, wherein the pre-processing includes communication termination processing for terminating communication with the external apparatus.

4. The apparatus according to claim 1, wherein said electronic apparatus includes an imaging unit adapted to perform radiation imaging; and the pre-processing includes processing for holding an image, which has been obtained by radiation imaging within said electronic apparatus, in a non-volatile memory.

5. The apparatus according claim 1, further comprising a connection control unit adapted to execute connection processing, which includes retransmission processing for retransmitting an image that has been stored in the memory, when connection of the cable to said cable connector unit has been detected.

6. A method of controlling a cable connector unit in an electronic apparatus having a cable connector unit that makes it possible to attach and detach a connector for connecting a cable for the purpose of performing data communication with an external apparatus, comprising:

a locking step of controlling a lock mechanism for the purpose of maintaining a connection with the connector in a lock state;

a detection step of detecting a first operation on the connector, which has been attached to the electronic apparatus;

a pre-processing step of executing pre-processing, which is necessary to detach the connector, in a case where the first operation has been detected;

a release step of releasing the lock mechanism in response to completion of the pre-processing, a connection control step of executing connection processing, which includes communication start processing for starting communication with the external apparatus, when connection of the cable to said cable connector unit has been detected, wherein the connection control step includes a step of restarting communication with the external apparatus via the cable in a case where detaching of the cable has not been performed in a predetermined period following execution of pre-processing, and wherein the pre-processing includes communication termination processing for terminating the supply of power to the cable where, if the cable is subsequently reinserted, then the cable's reinsertion is detected and the power supply resumes.

7. An X-ray imaging system comprising:

an X-ray generator configured to generate X-ray;

a sensor unit configured to detect intensity of an X-ray output from the X-ray generator, convert detected X-ray into an electrical signal and output the electrical signal to a cable through a detachable connector portion;

a power supply unit configured to supply the sensor unit with electrical power; and a control unit control configured to control the sensor unit via the cable and control the X-ray generator and the power supply unit, wherein the sensor unit controls a lock mechanism to lock a connection between the connector portion and the sensor unit when the sensor unit detects that the connector portion is connected to the sensor unit, and wherein the control unit controls the power supply unit to supply the electrical power to the sensor unit via the cable when the control unit detects that the connector portion is connected to the sensor unit.

* * * * *